United States Patent
MacFarland et al.

(10) Patent No.: US 8,086,893 B1
(45) Date of Patent: Dec. 27, 2011

(54) HIGH PERFORMANCE POOLED HOT SPARES

(75) Inventors: Jeffrey S. MacFarland, Wake Forest, NC (US); R. Christopher Fore, Apex, NC (US)

(73) Assignee: NetApp, Inc., Sunnyvale, CA (US)

( * ) Notice: Subject to any disclaimer, the term of this patent is extended or adjusted under 35 U.S.C. 154(b) by 266 days.

(21) Appl. No.: 12/534,017

(22) Filed: Jul. 31, 2009

(51) Int. Cl.
  *G06F 11/00* (2006.01)
(52) U.S. Cl. ............................................ 714/3; 714/6.22
(58) Field of Classification Search ............. 714/3, 4.11, 714/4.12, 6.1, 6.11, 6.12, 6.13, 6.2, 6.21, 714/6.22, 6.23, 6.24, 6.3, 6.32, 11.114, 132, 714/162; 711/114, 132, 162
See application file for complete search history.

(56) References Cited

U.S. PATENT DOCUMENTS

| | | | |
|---|---|---|---|
| 7,120,826 B2 * | 10/2006 | Fore et al. ...................... | 714/6.2 |
| 2006/0107129 A1 * | 5/2006 | Franklin et al. ................ | 714/710 |
| 2008/0126839 A1 * | 5/2008 | Sangapu et al. ................. | 714/5 |
| 2008/0168225 A1 * | 7/2008 | O'Connor ..................... | 711/114 |
| 2010/0050016 A1 * | 2/2010 | Franklin et al. ................... | 714/7 |

* cited by examiner

*Primary Examiner* — Dieu-Minh Le
(74) *Attorney, Agent, or Firm* — Perkins Coie LLP

(57) ABSTRACT

A high-performance spare disk pool is created as a logical construct for provisioning and managing striped hot spares. Two or more drives (nonvolatile mass storage devices) are logically grouped together to allow the input/output (I/O) write bandwidth during RAID reconstruction to be increased over that of a single drive. The reconstructed data can be written to the spare disk pool in a striped manner. After the reconstruction is complete, a background process can be executed to copy the reconstructed data on the spare disk pool back to a single physical spare disk drive with minimal performance impact.

41 Claims, 10 Drawing Sheets

HIGH PERFORMANCE POOLED HOT SPARES

FIELD OF THE INVENTION

At least one embodiment of the present invention pertains to data storage systems, and more particularly, to a technique for implementing "hot spare" storage devices.

BACKGROUND

In modern data storage systems, the technique known as "RAID" (for "redundant array of inexpensive disks") can be employed to provide high levels of reliability from groups of relatively low-cost and less reliable disk drives. There are a number of different types or "levels" of RAID, which vary in the degree of redundancy they provide as well as their complexity. With certain types of RAID, such as RAID-4 or RAID-DP for example, a "RAID group" includes multiple drives dedicated for storing data and one or more additional drives dedicated for storing parity information relating to the data on the data drives. Other forms of RAID, such as RAID-5, distribute the parity information across the data drives instead of using dedicated parity drives. In the event of a failure of a particular drive, the information on the remaining drives can be read and used to compute and reconstruct the data from the failed drive.

During RAID reconstruction, the data on the failed drive is typically constructed on a new replacement drive, or alternatively on a "hot spare" drive dedicated for use in RAID reconstruction. One common problem, however, is that RAID reconstruction can take many hours to complete, depending upon the size of the affected RAID group, and the ever-increasing size of hard drives has a proportional effect on the amount of time needed to complete a RAID reconstruction. It is desirable to complete a RAID reconstruction as quickly as possible, since during the reconstruction process the system has a lower resiliency to failure (called "degraded mode"). One of the factors that can lead to slow reconstruction is the limited rate at which data can be written to the reconstructing drive, which cannot be greater than the bandwidth of a single hard drive.

Two known techniques for addressing this problem are "distributed hot sparing" and "drive slicing". Both of these techniques distribute the data and the hot spare space across multiple hard drives in some uniform manner. Distributed hot sparing involves pre-allocating one or more drives in a dedicated sparing relationship for a specific associated RAID group. In drive slicing, the data and hot spare space for multiple RAID groups are distributed across a single set of drives. In both of these techniques, however, one or more drives are pre-allocated to provide hot spare storage space. Such pre-allocation of drives is inflexible and often leads to a large amount of available storage space in the system going unused. Storage space is a valuable resource, and it is under desirable for it to be wasted. Furthermore, the characteristics of a given storage system may change over time (e.g., topology, drive types and capacity, etc.), such that a given allocation of hot spare space may become sub-optimal. The inflexibility of current techniques require the storage system to be taken off-line and physically and/or logically reconfigured in order to change its hot spare space allocation. In a large-scale storage system, it may be undesirable to take the system off-line for even a short time.

SUMMARY

The technique introduced here creates a high-performance spare disk pool as a logical construct for provisioning and managing striped hot spares in an efficient and straightforward manner. Specifically, two or more physical drives are logically grouped together as a single logical object to allow the input/output (I/O) write bandwidth during RAID reconstruction to be increased over that of a single drive. During reconstruction the data can be written to the physical drives represented by the single logical object in a striped manner. After the reconstruction is complete, a background process can be executed to copy the reconstructed data in the spare disk pool back to a single physical spare disk drive with reduced performance impact.

This technique can decrease the amount of time during which a storage system operates in degraded mode (i.e., during reconstruction), and therefore, reduces the amount of time during which user data is more vulnerable to loss. In addition, larger capacity drives can be used with less impact to reconstruction performance. Also, in contrast with the drive slicing and distributed hot sparing techniques, with the technique introduced here spare drives can be pooled and the resulting hot spare pool made available as hot spare space for multiple RAID groups. Furthermore, such a hot spare pool can service simultaneous reconstructions on two or more RAID groups. Furthermore, data striping policies are abstracted within the pool itself and can be adjusted, either statically or on-demand, to respond to system-level policies (such as service level agreements) and/or current system conditions. Additionally, a physical drive can be easily logically removed from the hot spare pool when it is not needed for data reconstruction and assigned for other uses.

Other aspects of the technique will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
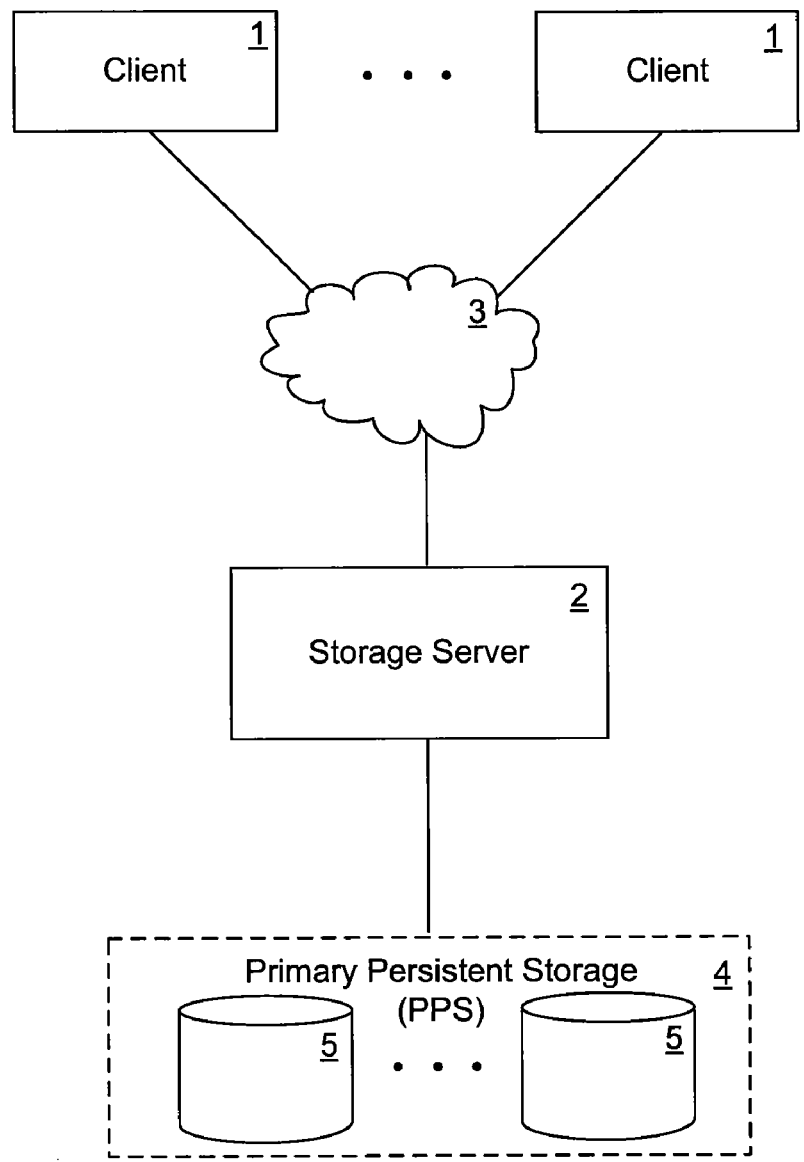
FIG. 1 illustrates a network storage environment in which the technique introduced here can be implemented.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

The technique introduced here can be implemented in a network storage server providing network attached storage (NAS) and/or storage area network (SAN) services, for example. Note, however, that the technique is not restricted to use in storage servers; it can be applied advantageously in essentially any data storage system that employs RAID or any other redundancy technique that has the ability to reconstruct data on a failed drive from the surviving drives. In addition, the technique is not limited to disk drives. For example, the technique can be applied to other forms of nonvolatile mass storage devices, including flash memory based devices, solid-state drives (SSDs), etc. Accordingly, the term "disk" is used here in certain instances only in an illustrative sense, to facilitate description. The term "drive" as used herein should be interpreted to mean any type of non-volatile mass storage device, including those mentioned above.

During administration of a network storage server, a storage administrator can be given the option (e.g., by a storage management application) to group two or more drives into a high-performance spare drive pool, or simply "hot spare pool". The hot spare pool is an abstraction, i.e. a logical construct, for provisioning and managing hot spares, which presents higher level entities with some amount of spare drive capacity (e.g., expressed in terabytes or petabytes). This spare drive capacity can be broken down into available spare capacity and consumed capacity.

In the event of a failure of a drive within a RAID group, the server automatically queries the hot spare pool to see if there is sufficient capacity of an acceptable class of storage. Examples of classes of storage that may exist in a system include Fibre Channel (FC), serial attached SCSI (SAS), and serial ATA (SATA), to name just a few.

Based on this query, a logical hot spare drive may be provisioned to meet the reconstruction need. This logical drive can be distributed across multiple physical drives (e.g., striped across a "slice" of multiple member disks). The reconstruct operation can then proceed on this logical high-performance hot spare. When multiple physical drives are used, the reconstruct speed is no longer limited by the write bandwidth of a single drive.

Once the reconstruction is complete, the distributed reconstructed data can then be copied onto a single physical drive at a convenient time by using a background process, i.e., a process which is not disruptive or even necessarily visible to users or higher-level processes. The result of this background copy operation is that more drive capacity is available for the next time a "high-performance spare" is needed.

The background copy operation is different from the reconstruct operation in at least two significant ways: First, the copy can be done while the RAID group is fully redundant (user data is not exposed). Second, the copy is less computationally intensive than a reconstruct operation, since less data is moved and there is no need to do parity computation.

There are at least two approaches for performing the background copy operation. The reconstructed data can be collected on a single physical spare drive in the hot spare pool, that could then be removed from the hot spare pool. Alternatively, the system can wait for the original disk to be replaced, and then "copy-back" the reconstructed data onto that replacement disk.

As noted above, the technique introduced here can be implemented in a network storage system. FIG. 1 illustrates an environment in which the technique can be employed. In FIG. 1, a network storage server 2 is coupled to a primary persistent storage (PPS) subsystem 4 and is also coupled to a set of clients 1 through an interconnect 3. The interconnect 3 may be, for example, a local area network (LAN), wide area network (WAN), metropolitan area network (MAN), global area network such as the Internet, a Fibre Channel fabric, or any combination of such interconnects. Each of the clients 1 may be, for example, a conventional personal computer (PC), server-class computer, workstation, handheld computing/communication device, or the like.

Storage of data in the PPS subsystem 4 is managed by the storage server 2. The storage server 2 receives and responds to various read and write requests from the clients 1, directed to data stored in or to be stored in the storage subsystem 4. The PPS subsystem 4 includes a number of nonvolatile mass storage devices 5, which can be, for example, conventional magnetic or optical disks or tape drives; alternatively, they can be non-volatile solid-state memory, such as flash memory, or any combination of such devices. It is assumed that the mass storage devices 5 in PPS subsystem 4 are organized into one or more RAID groups, and the storage server 2 accesses the storage subsystem 4 using a RAID algorithm for redundancy (e.g., RAID-4, RAID-5 or RAID-DP).

The storage server 2 may provide file-level data access services to clients 1, such as commonly done in a NAS environment, or block-level data access services such as commonly done in a SAN environment, or it may be capable of providing both file-level and block-level data access services to clients 1. Further, although the storage server 2 is illustrated as a single unit in FIG. 1, it can have a distributed architecture. For example, the storage server 2 can be designed as a physically separate network module (e.g., "N-blade") and disk module (e.g., "D-blade") (not shown), which communicate with each other over a physical interconnect. Such an architecture allows convenient scaling, such as by deploying two or more N-modules and D-modules, all capable of communicating with each other through the interconnect.

The storage server 2 includes a storage operating system for use in controlling its basic operations (e.g., reading and writing data in response to client requests). In certain embodiments, the storage operating system is implemented in the form of software and/or firmware stored in one or more storage devices in the storage server 2.

Figure 2:
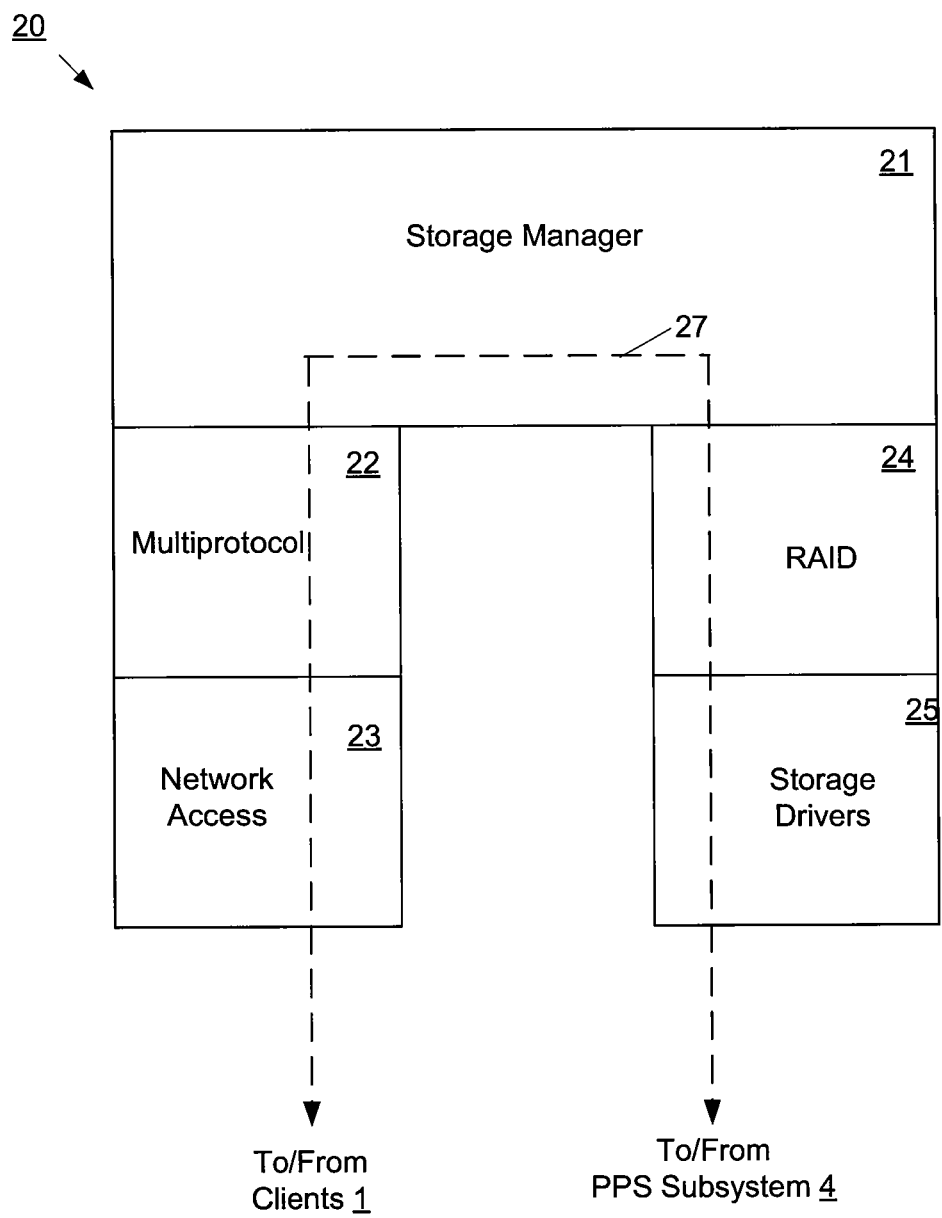
FIG. 2 illustrates an example of the architecture of the storage operating system of a storage server.

FIG. 2 schematically illustrates an example of the architecture of the storage operating system in the storage server 2. In certain embodiments the storage operating system 20 is implemented in the form of software and/or firmware. In illustrated embodiment, the storage operating system 20 includes several modules, or "layers". These layers include a storage manager 21, which is the core functional element of the storage operating system 20. The storage manager 21 imposes a structure (e.g., a hierarchy) on the data stored in the PPS subsystem 4 and services read and write requests from clients 1. To improve performance, the storage manager 21 may accumulate batches of writes in a buffer cache (not shown) of the storage server 2 and then stream them to the PPS subsystem 4 as large, sequential writes. In certain embodiments, the storage manager 21 implements a journaling file system and implements a "write out-of-place" (also called "write anywhere") policy when writing data to the PPS subsystem 4. In other words, whenever a logical data block is modified, that logical data block, as modified, is written to a new physical storage location (physical block), rather than overwriting the data block in place.

To allow the storage server 2 to communicate over the network 3 (e.g., with clients 1), the storage operating system 20 also includes a multiprotocol layer 22 and a network access layer 23, logically "under" the storage manager 21.

The multiprotocol 22 layer implements various higher-level network protocols, such as Network File System (NFS), Common Internet File System (CIFS), Hypertext Transfer Protocol (HTTP), Internet small computer system interface (iSCSI), and/or backup/mirroring protocols. The network access layer 23 includes one or more network drivers that implement one or more lower-level protocols to communicate over the network, such as Ethernet, Internet Protocol (IP), Transport Control Protocol/Internet Protocol (TCP/IP), Fibre Channel Protocol (FCP) and/or User Datagram Protocol/Internet Protocol (UDP/IP).

Also, to allow the storage server 2 to communicate with the persistent storage subsystem 4, the storage operating system 20 includes a storage access layer 24 and an associated storage driver layer 25 logically under the storage manager 21. The storage access layer 24 implements a higher-level disk storage redundancy algorithm, such as RAID-4, RAID-5 or RAID-DP and, therefore, is henceforth referred to as "RAID layer 24", to facilitate description. At least some aspects of the technique introduced here are implemented in the RAID layer 24, as described further below. The storage driver layer 25 implements a lower-level storage device access protocol, such as Fibre Channel Protocol (FCP) or small computer system interface (SCSI).

Also shown in FIG. 2 is the path 27 of data flow through the storage operating system 20, associated with a read or write operation, from the client interface to the PPS interface. Thus, the storage manager 21 accesses the PPS subsystem 4 through the storage access layer 24 and the storage driver layer 25.

The storage operating system 20 can have a distributed architecture. For example, the multiprotocol layer 22 and network access layer 23 can be contained in an N-module (e.g., N-blade) while the storage manager 21, storage access layer 24 and storage driver layer 25 are contained in a separate D-module (e.g., D-blade). In such cases, the N-module and D-module communicate with each other (and, possibly, other N- and D-modules) through some form of physical interconnect and collectively form a storage server node". Such a storage server node may be connected with one or more other storage server nodes to form a highly scalable storage server cluster.

Figure 3:
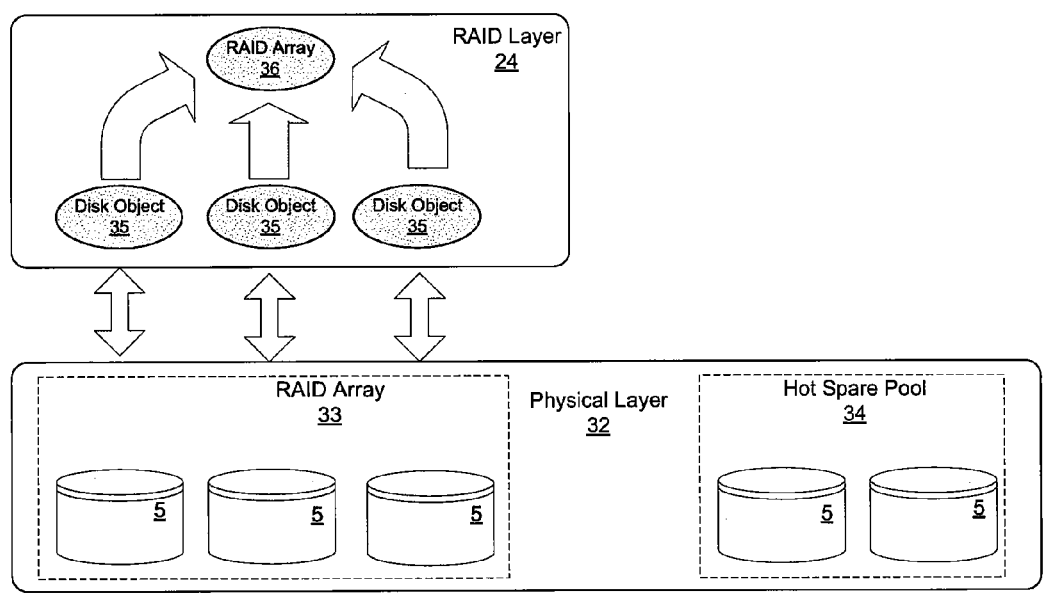
FIG. 3 schematically illustrates the RAID layer and physical layer of a storage system that includes a RAID array and a hot spare pool.

Refer now to FIG. 3, which schematically illustrates certain layers of the storage system during normal operation. The physical layer 32 (which may represent the PPS subsystem 4 in FIG. 1) includes at least one RAID array (RAID group) 33, as well as a hot spare pool 34 that includes two or more spare physical drives 5. In the illustrated embodiment a RAID group 33 is made up of three physical drives 5, although the technique introduced here is not restricted to any particular number of drives in a RAID group or in the hot spare pool. Each physical drive contained in the RAID array 33 has an associated disk object 35 in the RAID layer 24, which are logical objects. The disk objects are associated with a single RAID array (logical) object 36. During operation, commands are passed down from the RAID array object to the appropriate disk object, which in turn communicates with the associated physical drive. Information is returned from the physical drive 5 to the associated disk object 35 and then from the disk object 45 to the associated RAID array object 36. The RAID array object 36 communicates with the storage manager 21 described above (not shown in FIG. 4).

Figure 4:
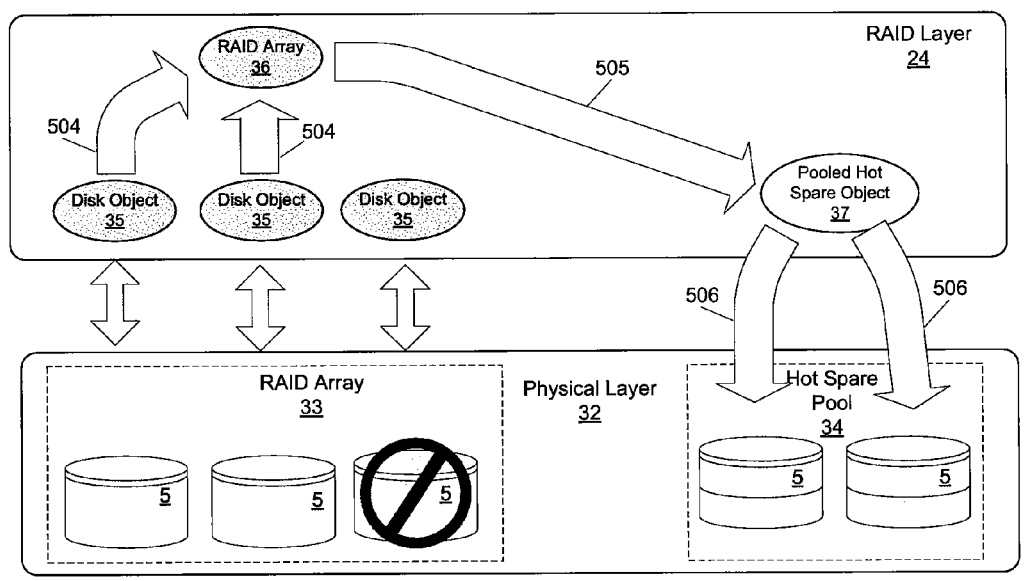
FIG. 4 schematically illustrates the system and associated data flow during RAID reconstruction due to a disk failure, in accordance with the technique introduced here.
Figure 5:
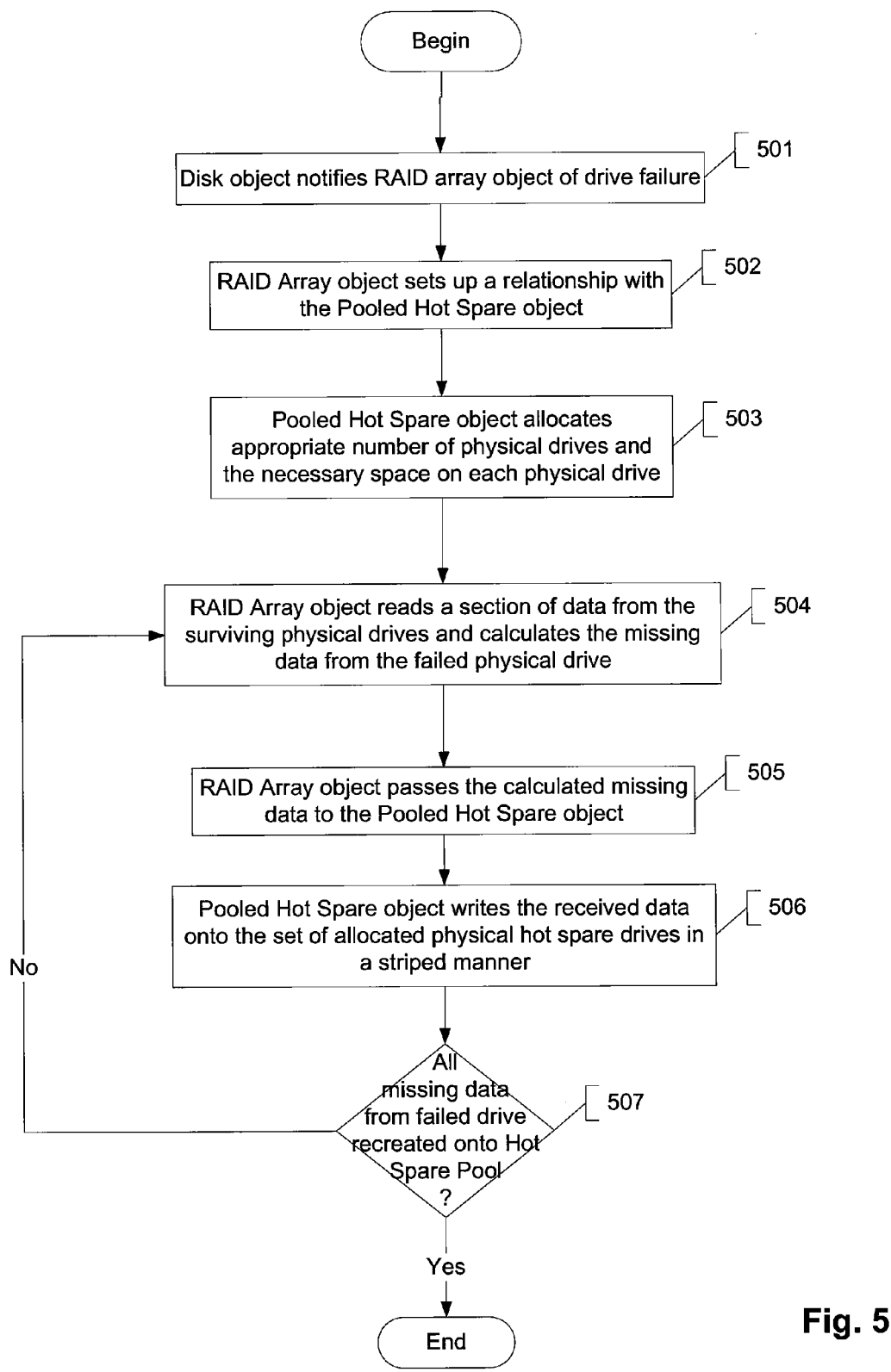
FIG. 5 is a flow diagram illustrating the RAID reconstruction process.

The manner in which the technique handles RAID reconstruction in response to a drive failure is described now with reference to FIGS. 4 and 5. Suppose that one of the drives 5 in the RAID array 33 fails (indicated in FIG. 4 with a circle with a slash through it). The disk object 35 associated with the failed drive detects the failure and notifies the RAID array object 36 of the failure at 501. At 502 the RAID array object 36 establishes a relationship with a pooled hot spare object 37, which is also a logical object created by the RAID layer 24. In this operation the pooled hot spare object 37 becomes associated with the RAID Array object 36 in a manner analogous to the association between a disk object 35 and RAID array object 36. The pooled hot spare object 37 may be created prior to the failure, or it may be created on demand in response to the failure being detected.

At 503 the pooled hot spare object 37 allocates the appropriate number of physical drives 5 for the reconstruction operation, including selecting which particular hot spare drives will be used for the reconstruction, and allocates the necessary space on each selected physical drive. The number of physical drives selected for the reconstruction and which particular drives are selected can be based upon any of various factors and may be determined dynamically in response to the failure. These attributes can be determined based on a predetermined reconstruction policy, as a function of any one or more of various parameters, such as: the amount of used storage space in the failed drive; the number of other RAID reconstructions taking place in the system at the current time; the number of concurrent reconstructions in which a single disk can participate; service-level agreement (SLA) for the RAID array 33 (as expressed in terms of, for example, maximum latency, minimum bandwidth, and minimum availability); the number of surviving disks in RAID Array 33; current host workload for RAID array 33; and/or other factors. There are many possible implementation possibilities for such a policy. As one example, logic could attempt to balance the write bandwidth of the pooled hot spare object 37, the available reconstruction read bandwidth of the surviving disks, and the permitted system processing overhead allocated to RAID Array 36. Data defining the actual policies can be stored as persistent metadata in the PPS 4 or inside the storage server 2, for example. Hence, the data striping policies are abstracted within the hot spare pool itself and can be adjusted, either statically or on-demand, to respond to system-level policies (such as service level agreements) and/or current system conditions.

At 504 the RAID array object 36 reads a section of data from the surviving physical drives in the RAID array 33 and calculates the missing data, i.e., the data from the failed physical drive. At 505 the RAID array object 36 passes the calculated missing data to the pooled hot spare object 37. The pooled hot spare object 37 then writes the received data onto the set of allocated physical hot spare drives in a striped manner at 506. If all of the missing data from the failed drive have been re-created onto the hot spare pool at 507, then the process ends; otherwise the process loops back to 504, and 504 through 507 are repeated until that is the case.

As noted above, after all of the data from the failed drive have been reconstructed to the hot spare pool, the reconstructed data can be copied as a background process to a single physical drive ("destination drive") that can be the reconstructed data's new "permanent" (long term) location. This copying makes those disks utilized for the reconstruction in the hot spare pool available again for use as hot spares. The single physical drive can be, for example, a member of the hot spare pool, which is logically removed from the hot spare pool after the copying is complete. Alternatively, it can be a replacement drive for the failed drive, i.e., outside the hot spare pool.

Figure 6:
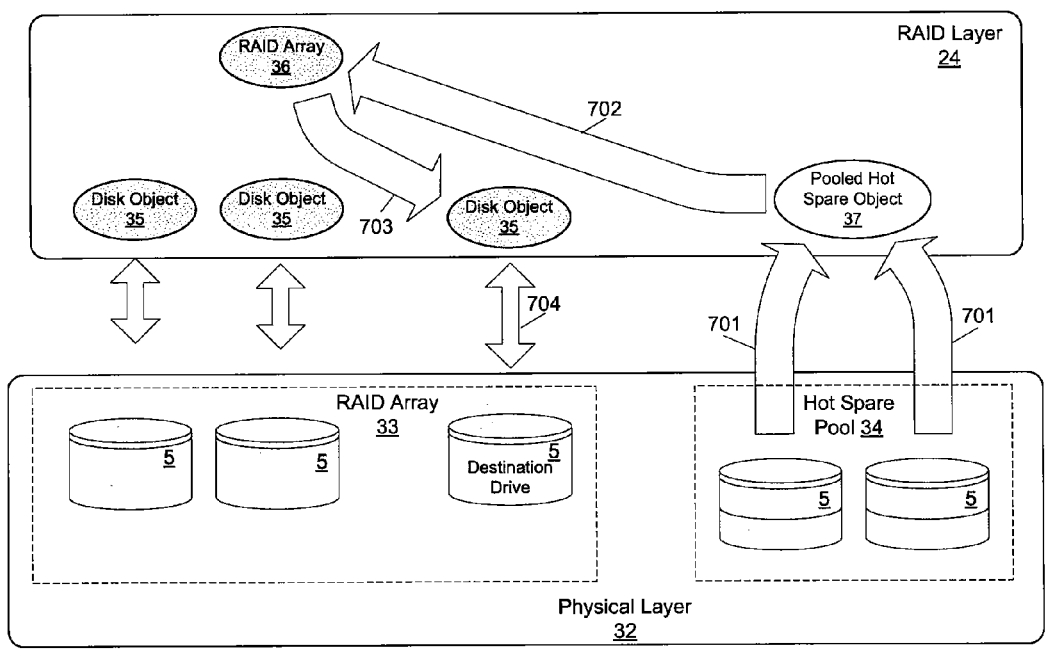
FIG. 6 schematically illustrates the system and associated data flow during a post-reconstruction copying process, in accordance with the technique introduced here.
Figure 7:
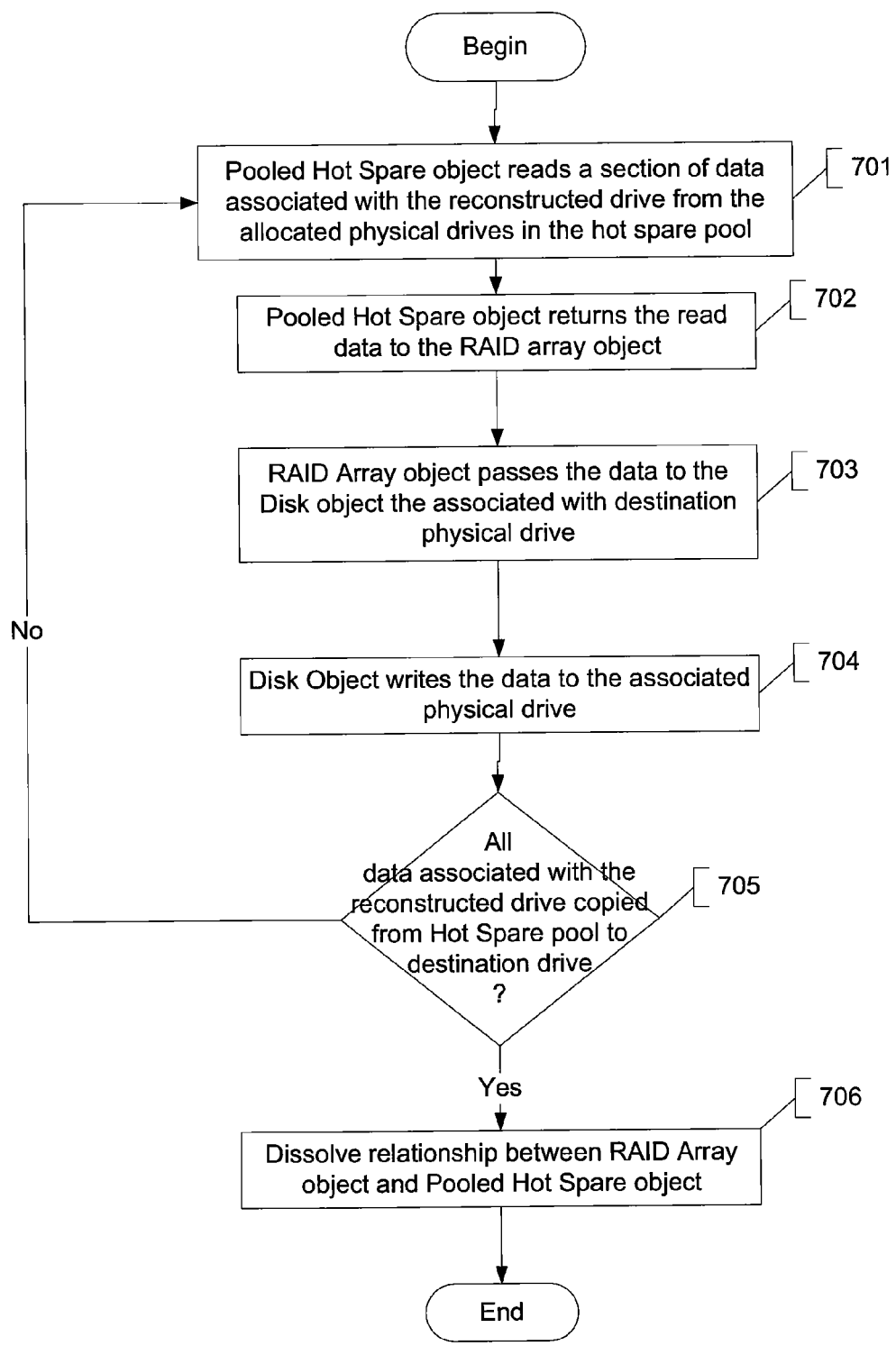
FIG. 7 is a flow diagram illustrating the post-reconstruction copying process.

The post-reconstruction background copy process is described further now with reference to FIGS. 6 and 7. Initially, at 701 the pooled hot spare object 37 reads a section of data associated with the reconstructed drive from the drives in the hot spare pool that were used for the reconstruction. The pooled hot spare object 37 then returns the read data to the RAID array object 36 at 702. At 703 the RAID array object 36 passes the data to the disk object 35 associated with the destination physical drive. That disk object 35 then writes the data to the destination physical drive at 704. If all of data associated with the reconstructed drive have been copied from the hot spare pool to the destination drive at 705, then the association between RAID array object 36 and pooled hot spare object 37 is dissolved at 706, and the process then ends; otherwise the process loops back to 701 and repeats until that is the case.

The technique introduced here can be particularly advantageous when used with solid-state nonvolatile storage devices, such as flash based SSDs. Although the low capacity and relatively low write bandwidth of a single SSD make it unattractive for use as a spare disk, pooling multiple SSDs together in the manner described above creates a logical construct which has sufficient capacity and high write data bandwidth. SSDs can also support multiple concurrent operations with little loss of efficiency. For example, an SSD-based pooled hot spare can efficiently service host read requests while acting as the source for a "copy-back" process that de-stages the reconstructed data back to rotating storage media.

Figure 8A:
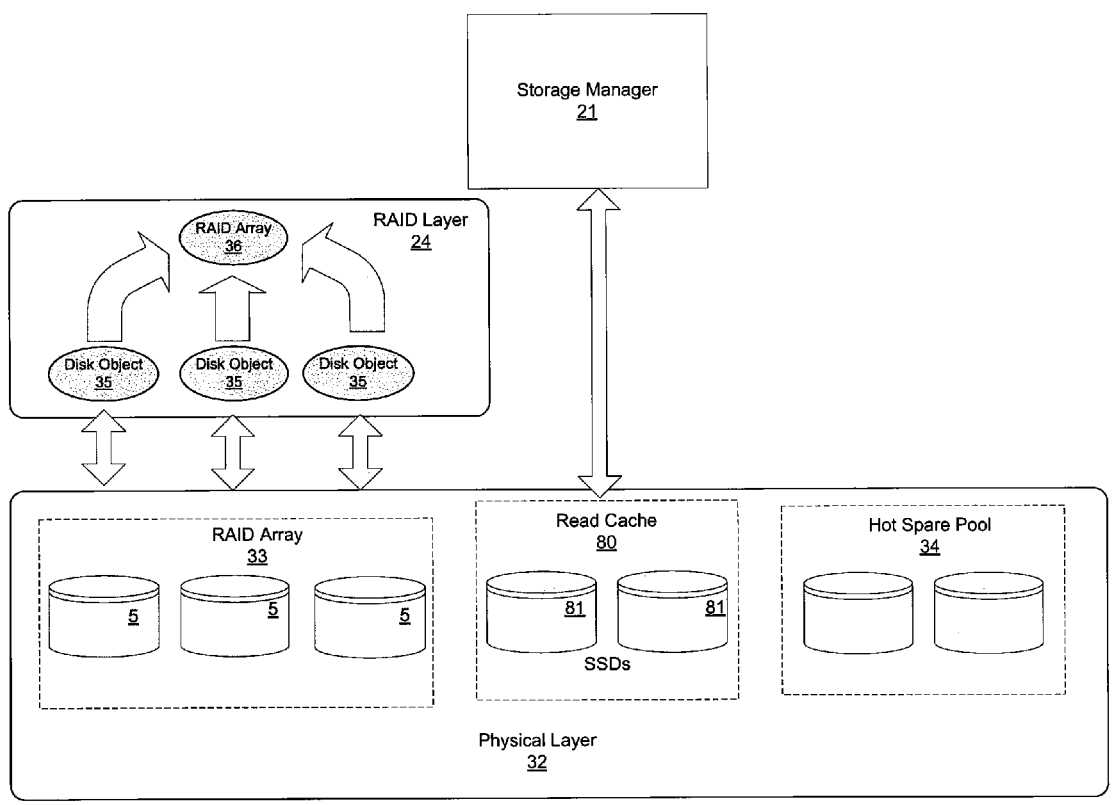
FIGS. 8A and 8B schematically illustrate the system including the use and repurposing of SSDs for part of the hot spare pool.
Figure 8B:
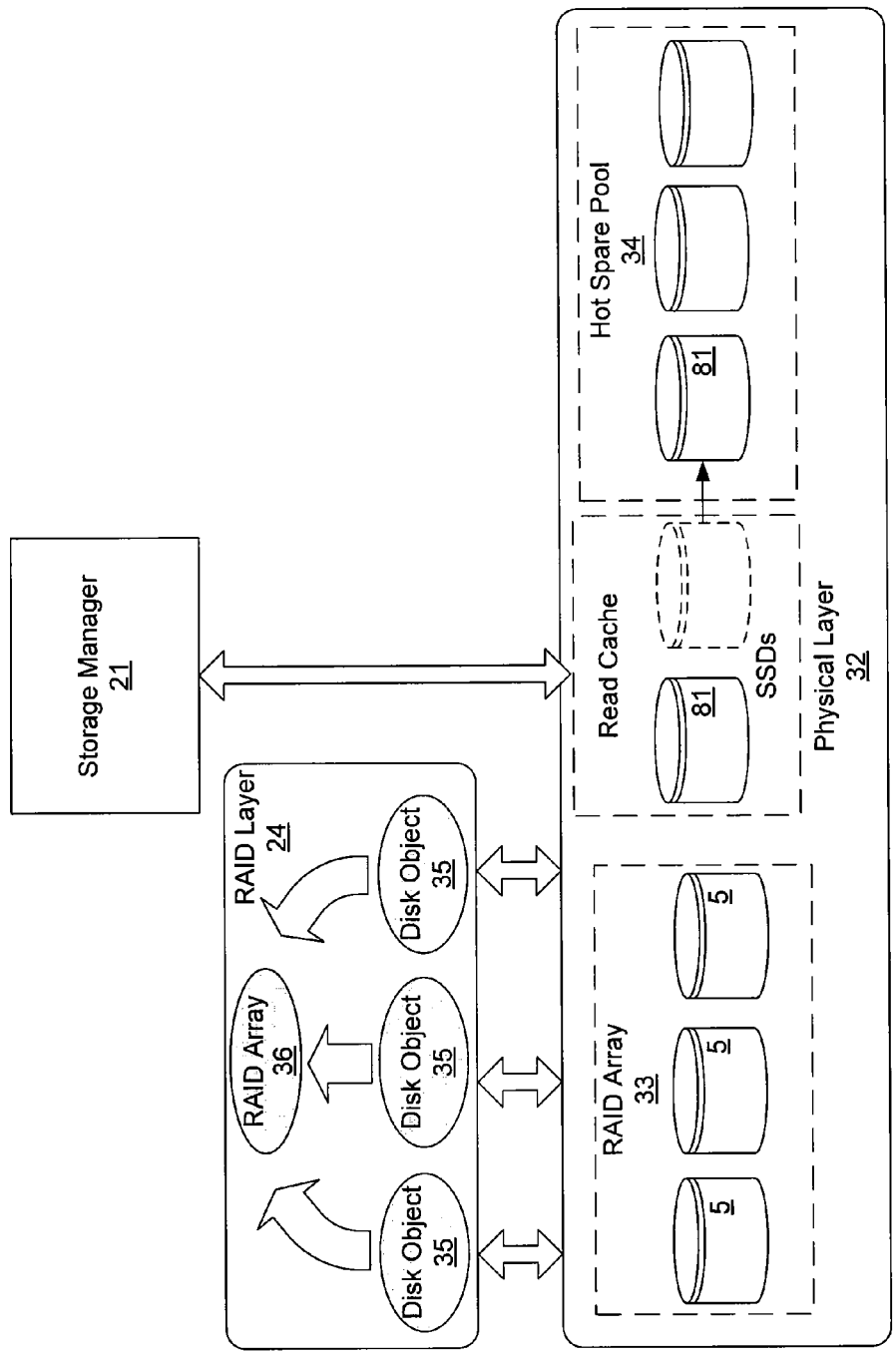

Although the high cost/capacity of SSDs (compared to rotating media) suggests that it would be expensive to dedicate them to the use described here, a scheme can be employed in which SSDs are used for some other purpose during optimal operation (e.g., as backing store for a read cache) and then re-tasked to the high-performance hot spare pool in the event of a disk failure, as illustrated in FIGS. 8A and 8B. As shown in FIG. 8A, during normal operation a system similar to that described above includes a number of flash-based SSDs 81 that are used as a read cache 80 for purposes of more efficiently serving client initiated read requests. The read cache 80 may be used in addition to a RAM-based buffer cache (not shown). In the event of a drive failure of one of the drives, one or more of the SSDs 81 are then "repurposed", i.e., are logically reassigned from the read cache 80 to the hot spare pool 34, as shown in FIG. 8B. This function reassignment may be carried out by the pooled hot spare object 37 (not shown). This process may then be reversed after the data reconstruction and background copying processes described above have been completed.

Figure 9:
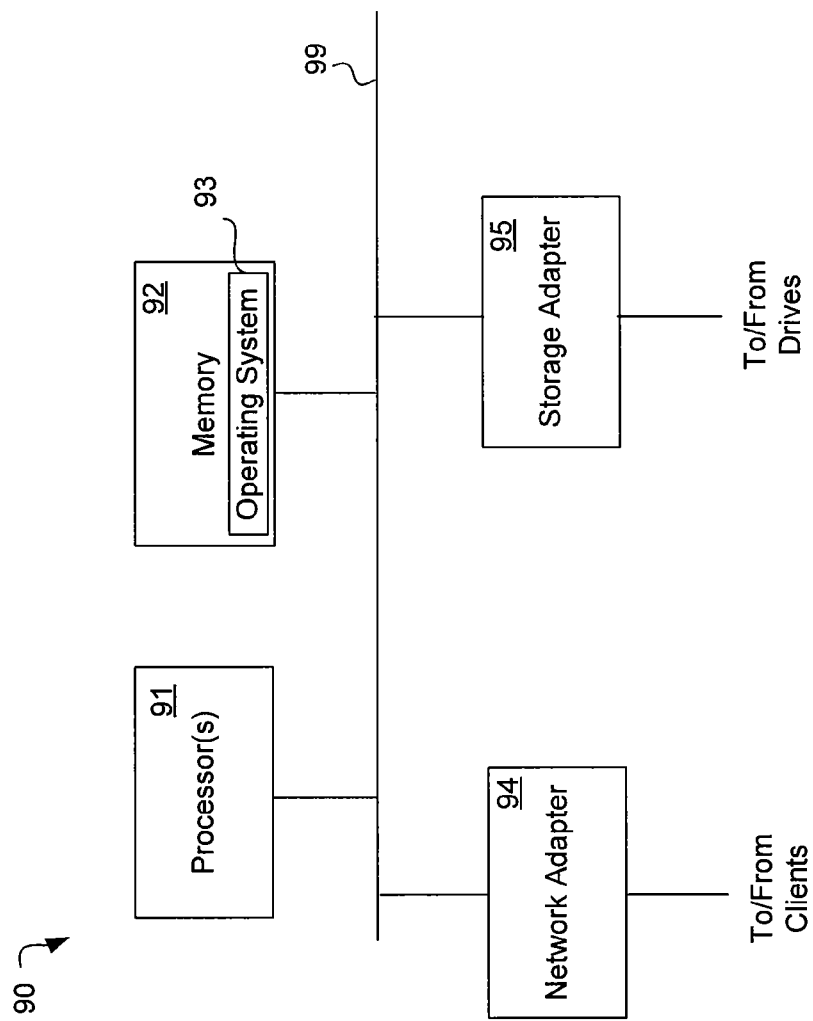
FIG. 9 illustrates an example of the hardware architecture of a network storage server.

FIG. 9 is a high-level block diagram showing an example of the architecture of the hardware of a network storage server in which the techniques described above can be implemented (e.g., storage server 2 in FIG. 1). In the illustrated embodiment, the storage server 90 includes one or more processors 91 and memory 92 coupled to an interconnect 99. The interconnect 93 shown in FIG. 9 is an abstraction that represents any one or more separate physical buses, point-to-point connections, or both, connected by appropriate bridges, adapters, or controllers. The interconnect 93, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 91 is/are the central processing unit (CPU) of the storage server 90 and, thus, control the overall operation of the storage server 90. In certain embodiments, the processor(s) 91 accomplish this by executing software or firmware stored in memory 92. The processor(s) 91 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 92 is or includes the main memory of the storage server 2. The memory 92 represents any form of random access memory (RAM), read-only memory (ROM), flash memory, or the like, or a combination of such devices. In use, the memory 92 may contain, among other things, code 93 embodying the storage operating system 20 (FIG. 2).

Also connected to the processor(s) 91 through the interconnect 93 are a network adapter 94 and a storage adapter 95. The network adapter 94 provides the storage server 90 with the ability to communicate with remote devices, such as hosts 1, over the interconnect 93 and may be, for example, an Ethernet adapter or Fibre Channel adapter. The storage adapter 95 allows the storage server 90 to access the PPS subsystem 4 and may be, for example, a Fibre Channel adapter or SCSI adapter.

The techniques introduced above can be implemented in circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   detecting a failure of a particular storage device in a redundant array of non-volatile mass storage devices in a storage system; and
   reconstructing data stored in the particular storage device from data stored in at least one other non-volatile mass storage device in the redundant array, by writing to a logical object which collectively represents two or more non-volatile mass storage devices in a hot spare pool of non-volatile mass storage devices, to cause reconstructed data to be written in a distributed manner across the two or more non-volatile mass storage devices represented by the logical object.

2. A method as recited in claim 1, further comprising:
copying the reconstructed data from said two or more non-volatile mass storage devices to a single physical storage device as a background process of the storage system.

3. A method as recited in claim 2, wherein said copying comprises:
copying the reconstructed data to a single non-volatile mass storage device outside the hot spare pool.

4. A method as recited in claim 2, wherein said copying comprises:
collecting the reconstructed data on a single selected non-volatile mass storage device in the hot spare pool; and then
logically removing the single selected non volatile mass storage device from the hot spare pool.

5. A method as recited in claim 1, further comprising:
creating the logical object in response to the failure of the particular storage device.

6. A method as recited in claim 5, further comprising:
in response to the failure, determining a number of non-volatile mass storage devices from the hot spare pool that are to be represented by the logical object, based on a specified criterion.

7. A method as recited in claim 5, further comprising:
in response to the failure, selecting said two or more non-volatile mass storage devices from among at least three non-volatile mass storage devices assigned to the hot spare pool that are to be represented by the logical object, based on a specified criterion.

8. A method as recited in claim 7, wherein the specified criterion is from the list consisting of:
a number of storage devices assigned to participate in a given reconstruction;
a number of concurrent reconstructions within the storage system;
a number of concurrent reconstructions in which a single storage device can participate;
a service-level agreement for the redundant array;
a number of non-failed storage devices in the redundant array; and
a current host workload for the redundant array.

9. A method as recited in claim 1, further comprising:
logically removing a non-volatile mass storage device from the hot spare pool and assigning the removed non-volatile mass storage device for use other than as a member of the hot spare pool, when said non-volatile mass storage device is not needed for data reconstruction.

10. A method as recited in claim 1, further comprising:
using the hot spare pool as hot spare support for a plurality of redundant arrays of non-volatile mass storage devices in the storage system, such that the hot spare pool is available for reconstruction of data from a failed storage device in any of the plurality of redundant arrays.

11. A method as recited in claim 1, further comprising:
using a solid-state non-volatile memory device as at least part of a read cache of the storage system during a non-failure mode of operation of the storage system; and
in response to the failure of the particular storage device in the redundant array of non-volatile mass storage devices, using the solid-state non-volatile memory device as one of the storage devices represented by the logical object, to reconstruct data stored in the particular storage device.

12. A method as recited in claim 11, further comprising:
copying reconstructed data from the solid-state non-volatile memory device to another hot spare storage device while using the solid-state non-volatile memory device as part of the read cache.

13. A method comprising:
detecting a failure of a particular storage device in a RAID array that includes a plurality of non-volatile mass storage devices of a network storage server;
in response to the failure of the particular storage device, determining which of a plurality of non-volatile mass storage devices in a hot spare pool are to be used for reconstruction of data stored in the particular storage device, based on a specified criterion, and mapping the determined non-volatile mass storage devices in the hot spare pool to a logical storage object;
reconstructing data stored in the particular storage device by using a RAID reconstruction technique, including writing to the logical storage object to cause reconstructed data to be written in a distributed manner across the determined non-volatile mass storage devices in the hot spare pool; and
copying the reconstructed data from the determined non-volatile mass storage devices in the hot spare pool to a single physical storage device as a background process of the network storage server.

14. A method as recited in claim 13, wherein said copying comprises:
copying the reconstructed data to a single non-volatile mass storage device outside the hot spare pool.

15. A method as recited in claim 13, wherein said copying comprises:
collecting the reconstructed data on a single selected non-volatile mass storage device in the hot spare pool; and then
logically removing the single selected non-volatile mass storage device from the hot spare pool.

16. A method as recited in claim 13, wherein determining the plurality of non-volatile mass storage devices in the hot spare pool to be used for reconstruction of data comprises:
in response to the failure, determining a number of non-volatile mass storage devices in the hot spare pool that are to be mapped to the logical storage object.

17. A method as recited in claim 13, further comprising:
logically removing a non-volatile mass storage device from the hot spare pool and assigning the removed non-volatile mass storage device for use other than as a member of the hot spare pool, when said non-volatile mass storage device is not needed for data reconstruction.

18. A method as recited in claim 13, further comprising:
using the hot spare pool as hot spare support for a plurality of RAID arrays in the network storage server, such that the hot spare pool is available for reconstruction of data from a failed storage device in any of the plurality of RAID arrays.

19. A method as recited in claim 13, further comprising:
using a solid-state non-volatile memory device as at least part of a read cache of the network storage server during a non-failure mode of operation of the network storage server; and
in response to the failure of the particular storage device, using the solid-state non-volatile memory device as one of the storage devices represented by the logical storage object, to reconstruct data stored in the particular storage device.

20. A method as recited in claim 19, further comprising:
copying reconstructed data from the solid-state non-volatile memory device to another hot spare storage device while using the solid-state non-volatile memory device as part of the read cache.

21. A processing system comprising:
a processor;
a storage interface through which to access a first redundant array of non-volatile mass storage devices; and
a storage access module configured to detect a failure of a particular storage device in the first redundant array of non-volatile mass storage devices, and further configured to reconstruct data stored in the particular storage device in response to the failure of the particular storage device, by writing to a logical object which collectively represents two or more non-volatile mass storage devices in a hot spare pool of non-volatile mass storage devices, and further configured to cause reconstructed data to be written in a distributed manner across the two or more non-volatile mass storage devices represented by the logical object.

22. A processing system as recited in claim 21, wherein the storage access module is further configured to copy the reconstructed data from said two or more non-volatile mass storage devices to a single physical hot spare storage device as a background process of the processing system.

23. A processing system as recited in claim 22, wherein copying the reconstructed data from said two or more non-volatile mass storage devices to a single physical storage device comprises:
copying the reconstructed data to a single non-volatile mass storage device outside the hot spare pool.

24. A processing system as recited in claim 22, wherein said copying the reconstructed data from said two or more non-volatile mass storage devices to a single physical storage device comprises:
collecting the reconstructed data on a single selected non-volatile mass storage device in the hot spare pool; and then
logically removing the single selected non volatile mass storage device from the hot spare pool.

25. A processing system as recited in claim 21, wherein the storage access module is further configured to create the logical object in response to the failure of the particular storage device.

26. A processing system as recited in claim 25, wherein the storage access module is further configured to determine a number of non-volatile mass storage devices from the hot spare pool that are to be represented by the logical object in response to the failure, based on a specified criterion.

27. A processing system as recited in claim 25, wherein the storage access module is further configured to select said two or more non-volatile mass storage devices from among at least three non-volatile mass storage devices assigned to the hot spare pool that are to be represented by the logical object in response to the failure, based on a specified criterion.

28. A processing system as recited in claim 27, wherein the specified criterion is from the list consisting of:
a number of storage devices assigned to participate in a given reconstruction;
a number of concurrent reconstructions within the processing system;
a number of concurrent reconstructions in which a single storage device can participate;
a service-level agreement for the first redundant array;
a number of non-failed storage devices in the first redundant array; and
a current host workload for the first redundant array.

29. A processing system as recited in claim 21, wherein the storage access module is further configured to reassign a non-volatile mass storage device from the hot spare pool to a use other than as a member of the hot spare pool, when said non-volatile mass storage device is not needed for data reconstruction.

30. A processing system as recited in claim 21, wherein the storage access module is further configured to use the hot spare pool as hot spare support for both the first redundant array and a second redundant array of non-volatile mass storage devices, such that the hot spare pool is available for reconstruction of data from a failed storage device in either of the first and second redundant arrays.

31. A processing system as recited in claim 21, further comprising:
a solid-state non-volatile memory device;
logic to use the solid-state non-volatile memory device as at least part of a read cache of the processing system during a non-failure mode of operation of the processing system; and
logic to respond to the failure of the particular storage device in the first redundant array by using the solid-state non-volatile memory device as one of the storage devices represented by the logical object, to reconstruct data stored in the particular storage device.

32. A processing system as recited in claim 31, further comprising:
logic to copy reconstructed data from the solid-state non-volatile memory device to another hot spare storage device while using the solid-state non-volatile memory device as part of the read cache.

33. A network storage server comprising:
a processor;
a network interface through which to receive a data access request from a storage client and through which to send to the storage client a response to the request;
a storage interface through which to access a first redundant array of non-volatile mass storage devices;
logic to detect a failure of a particular storage device in the first redundant array
logic to determine, in response to the failure of the particular storage device, which of a plurality of non-volatile mass storage devices in a hot spare pool are to be used for reconstruction of data stored in the particular storage device based on a specified criterion, and to map the determined non-volatile mass storage devices in the hot spare pool to a logical storage object; and
logic to reconstruct data stored in the particular storage device by writing to the logical storage object, to cause reconstructed data to be written in a distributed manner across the determined non-volatile mass storage devices in the hot spare pool.

34. A network storage server as recited in claim 33, further comprising:
logic to copy the reconstructed data from the determined non-volatile mass storage devices in the hot spare pool to a single physical storage device as a background process of the network storage server.

35. A network storage server as recited in claim 34, wherein copying the reconstructed data from the determined non-volatile mass storage devices in the hot spare pool to a single physical storage device comprises:
copying the reconstructed data to a single non-volatile mass storage device outside the hot spare pool.

36. A network storage server as recited in claim 34, wherein copying the reconstructed data from the determined non-volatile mass storage devices in the hot spare pool to a single physical hot spare storage device comprises:
 collecting the reconstructed data on a single selected non-volatile mass storage device in the hot spare pool; and then
 logically removing the single selected non-volatile mass storage device from the hot spare pool.

37. A network storage server as recited in claim 33, wherein the logic to determine which of the plurality of non-volatile mass storage devices in the hot spare pool are to be used for reconstruction of data comprises:
 logic to determine a number of non-volatile mass storage devices in the hot spare pool that are to be mapped to the logical storage object.

38. A network storage server as recited in claim 33, further comprising:
 logic to reassign a non-volatile mass storage device from the hot spare pool to a use other than as a member of the hot spare pool, when said non-volatile mass storage device is not needed for data reconstruction.

39. A network storage server as recited in claim 33, further comprising:
 logic to use the hot spare pool as hot spare support for both the first redundant array and a second redundant array of non-volatile mass storage devices, such that the hot spare pool is available for reconstruction of data from a failed storage device in either of the first and second redundant arrays.

40. A network storage server as recited in claim 33, further comprising:
 a solid-state non-volatile memory device;
 logic to use the solid-state non-volatile memory device as at least part of a read cache of the network storage server during a non-failure mode of operation of the network storage server; and
 logic to respond to the failure of the particular storage device in the first redundant array by using the solid-state non-volatile memory device as one of the storage devices represented by the logical object, to reconstruct data stored in the particular storage device.

41. A network storage server as recited in claim 40, further comprising:
 logic to copy reconstructed data from the solid-state non-volatile memory device to another hot spare storage device while using the solid-state non-volatile memory device as part of the read cache.

\* \* \* \* \*